Oct. 18, 1938.  J. E. TORBERT, JR  2,133,598
MIRROR FOR SPIRIT LEVELS
Filed March 4, 1936
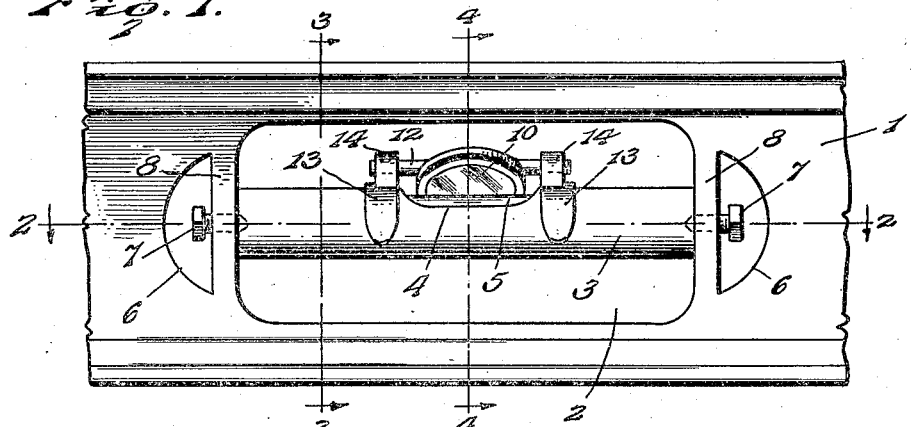
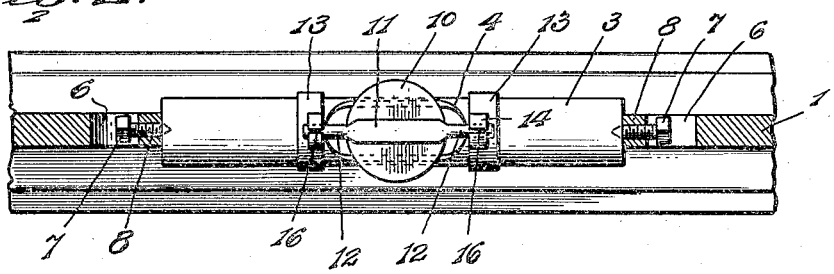
INVENTOR.
John E. Torbert, Jr.
BY
ATTORNEYS.

Patented Oct. 18, 1938

2,133,598

UNITED STATES PATENT OFFICE 2,133,598

MIRROR FOR SPIRIT LEVELS

John E. Torbert, Jr., National City, Calif.

Application March 4, 1936, Serial No. 67,147

1 Claim. (Cl. 88—94)

This invention relates to an attachment for a spirit level and more particularly relates to a mirror adapted to be mounted in such relation to the spaced openings of a vial holding tube that the exposed portion of the vial or spirit tube in the holder will be reflected in the mirror where it may be seen by a workman holding the level in such a positon that it is ordinarily impossible or at least very inconvenient to see the indicating bubble of the level.

Another object of the invention is to provide a mirror having associated therewith clamps which securely but detachably mount the mirror in operative relation to the level and permit the mirror to be tilted to a position in which a reflection of the indicating bubble may be easily seen in the mirror.

Another object of the invention is to so form the mirror and its attaching clamps that it may be easily applied to or removed from the vial holder of a level and thus permit it to be easily transferred from one level to another.

It is another object of the invention to so form the clamps of the mirror that the mirror may be adjusted longitudinally upon the vial holder and also moved circumferentially thereof to a position in which a reflection of the indicating bubble may be easily seen in the mirror or to a position at the opposite side of the vial holder from the sight opening where it will be out of the way and not interfere with a workman obtaining a clear view of the bubble when use of the mirror is not necessary.

The invention is illustrated in the accompanying drawing, wherein

Figure 1 is a view in elevation showing a mirror of the improved construction applied to the vial holder of a level.

Figure 2 is a sectional view taken longitudinally of Figure 1 along the line 2—2.

Figure 3 is a sectional view taken along the line 3—3 of Figure 1.

Figure 4 is a sectional view taken along the line 4—4 of Figure 1.

Figure 5 is a perspective view of the mirror.

This improved mirror has been shown applied to a level having the usual level bar or body 1 and formed with an opening 2 to receive the level tube or casing 3. This tube 3 is formed of strong metal such as brass or the like and is formed with the usual sight opening 4 so that the indicating bubble of the spirit glass or vial 5 may be seen. This vial holder or tube 3 extends longitudinally in the opening 2 and other openings 6 are formed in the level bar in spaced relation to ends of the opening 2 so that set screws 7 may be threaded through the portions 8 of the level bar between the openings 2 and 6 for engagement of their tapered ends in openings or seats formed at ends of the vial holding tube 3 and securely mount the same in the opening 2 with the flat face 9 of the vial holder lowermost.

The mirror 10 may be either circular in shape, as shown, rectangular, or any other desired shape and in the preferred construction, its diameter is slightly less than the length of the sight opening 4 of the vial holder or metal tube 3 so that when the mirror is applied to the vial holder substantially the entire exposed portion of the bubble glass or vial will be reflected in the mirror and a good view of the indicating bubble may be obtained. A cross bar or yoke 11 extends diametrically across the metal back or frame of the mirror to which it is brazed or otherwise rigidly secured and end portions of this cross bar project from opposite portions of the mirror, the projecting end portions being reduced and circular in cross section to define pintles 12. While it has been stated that end portions of the cross bar or yoke are reduced to form the pintles which are circular in cross section, it will be readily apparent that this bar may be formed from a metal rod of small diameter having its intermediate portion flattened to form the portion extending across and rigidly secured upon the back or frame of the mirror. Clamps 13, which are formed of resilient metal, are employed to mount the mirror, and by referring to Figure 5 it will be seen that each of the clamps is substantially U-shaped and carries an upstanding shank 14. These shanks may be formed integral with the clamps 13 or brazed to them and adjacent their upper ends, they are formed with openings 15 to receive the pintles 12. It should also be noted that upper ends of the shanks or bearing blocks 14 are split, as shown at 16, thus providing jaws 17, as shown in Figure 3, which extend about the pintles and have frictional binding engagement therewith so that while the mirror may be easily tilted to a position in which a reflection of the indicating bubble may be seen by a workman using the level, the mirror will be held in an adjusted position and prevented from accidentally tilting out of an adjusted position.

When a level provided with this improved mirror is in use, it may be applied to an overhead beam or the like which it is desired to test or to any surface which in such a position that the person using the level cannot look downwardly at the vial or bubble glass and obtain a clear view of the indicating bubble. When the level is in place, it is merely necessary to tilt the mirror to such a position that a reflection of the bubble may be seen in the mirror. When it is desired to use the level in such a position that the mirror will be in the way when looking down upon the bubble glass, it is merely necessary to shift the mirror circumferentially about the vial holder or tube 3 to a position in which it will be under this tube instead of over it. In view of the fact that the clamps 13 are substantially U-shaped, they may have their arms spread or thrust towards each other and thus permit the clamps to accommodate themselves to the diameter of the tube 3. It will be obvious that by forming the clamps as shown, they may be easily applied to or disconnected from the vial holding tube. In view of the fact that the mirror is applied directly to the vial holder instead of to the body of the level, it may be applied to a level of a conventional construction. It should also be noted that by loosening the set screws 7, the vial holder with the mirror attached thereto may be removed from the level bar and used for leveling purposes in confined spaces which would not accommodate a level bar.

Having thus described the invention, what is claimed as new is:

A mirror, a cross bar extending diametrically across the mirror and having a flat face secured in flat contacting engagement with the back of the mirror, said bar having end portions circular in cross section and forming pintles extending from opposite portions of said mirror, bearing blocks formed with openings rotatably receiving the pintles to pivotally mount the mirror, the bearing blocks being split to provide resilient arms engaged about the pintles and gripping the same to frictionally hold the mirror in an adjusted position, and substantially U-shaped clamps of resilient material carried by the bearing blocks and extending therefrom laterally of the pintles for engaging about a tube to detachably and adjustably connect the mirror therewith.

JOHN E. TORBERT, Jr.